Figure 2:
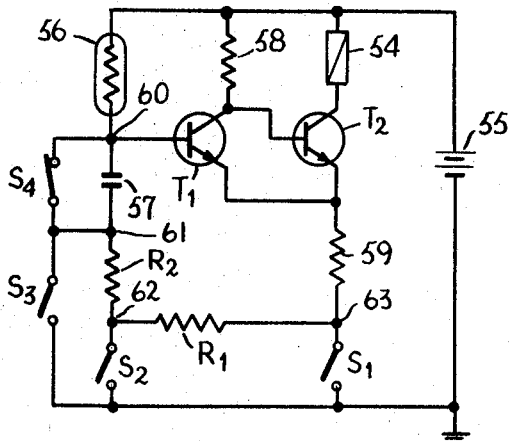

United States Patent

[11] 3,581,635

| [72] | Inventor | Kiyoshi Kitai<br>Tokyo, Japan |
|---|---|---|
| [21] | Appl. No. | 801,989 |
| [22] | Filed | Feb. 25, 1969 |
| [45] | Patented | June 1, 1971 |
| [73] | Assignee | Kabushiki Kaisha Hattou Tokeiten<br>Tokyo, Japan |
| [32] | Priority | Feb. 28, 1968 |
| [33] | | Japan |
| [31] | | 43/12429 |

[54] AUTOMATIC BRIGHTNESS DETECTION AND EXPOSURE CONTROL INTERLOCKING DEVICE
10 Claims, 2 Drawing Figs.

[52] U.S. Cl. .................................................. 95/10, 95/11.5
[51] Int. Cl. ................................................... G01j 1/00
[50] Field of Search ........................................ 95/11, 11.5, 10 C

[56] References Cited
UNITED STATES PATENTS

| 3,232,191 | 2/1966 | Sherwood............... | 95/10C |
| 3,374,718 | 3/1968 | Hochreiter............... | 95/10C |
| 3,397,629 | 8/1968 | Mori et al. .............. | 95/10C |

FOREIGN PATENTS

| 1,553,500 | 12/1968 | France..................... | 95/11 |

*Primary Examiner*—Samuel S. Matthews
*Assistant Examiner*—Robert P. Greiner
*Attorneys*—Robert E. Burns and Emmanuel J. Lobato ABSTRACT: A camera is equipped with apparatus including an electric circuit for sensing the brightness of a selected subject to be photographed and indicator means visible to the camera operator and including a pointer arm automatically movable to either one of three positions depending upon the degree of brightness of the selected subject. The apparatus includes mechanism for moving the pointer arm into one of the three positions in response to the sensing of the brightness of the selected subject.

Patented June 1, 1971  3,581,635

AUTOMATIC BRIGHTNESS DETECTION AND EXPOSURE CONTROL INTERLOCKING DEVICE

The present invention relates to a camera having apparatus and an electric circuit for sensing the brightness of a selected subject and includes a movable pointer arm that automatically aligns with suitable indicia that indicates three general subject brightness conditions, i.e., subject brightness sufficient to take a normal time exposure in daylight, subject brightness sufficient only to take a long time exposure in daylight and subject brightness insufficient to take an exposure utilizing daylight alone. The pointer arm automatically aligns with the indicia correctly indicating the brightness of the selected subject in response to the means in the electric circuit utilized to sense the brightness of the subject to be photographed.

It is an object of the present invention to provide in a camera improved apparatus for taking an exposure.

It is another object of the present invention to provide in a camera apparatus for indicating to the camera operator the general degree of brightness of the subject to be photographed.

Having in mind the above and other objects that will be evident from an understanding of this disclosure, the invention comprises the devices, combinations and arrangements of parts as illustrated in the presently preferred embodiment of the invention which is hereinafter set forth in such detail as to enable those skilled in the art readily to understand the function, operation, construction and advantages of it when read in conjunction with the accompanying drawings.

Figure 1:
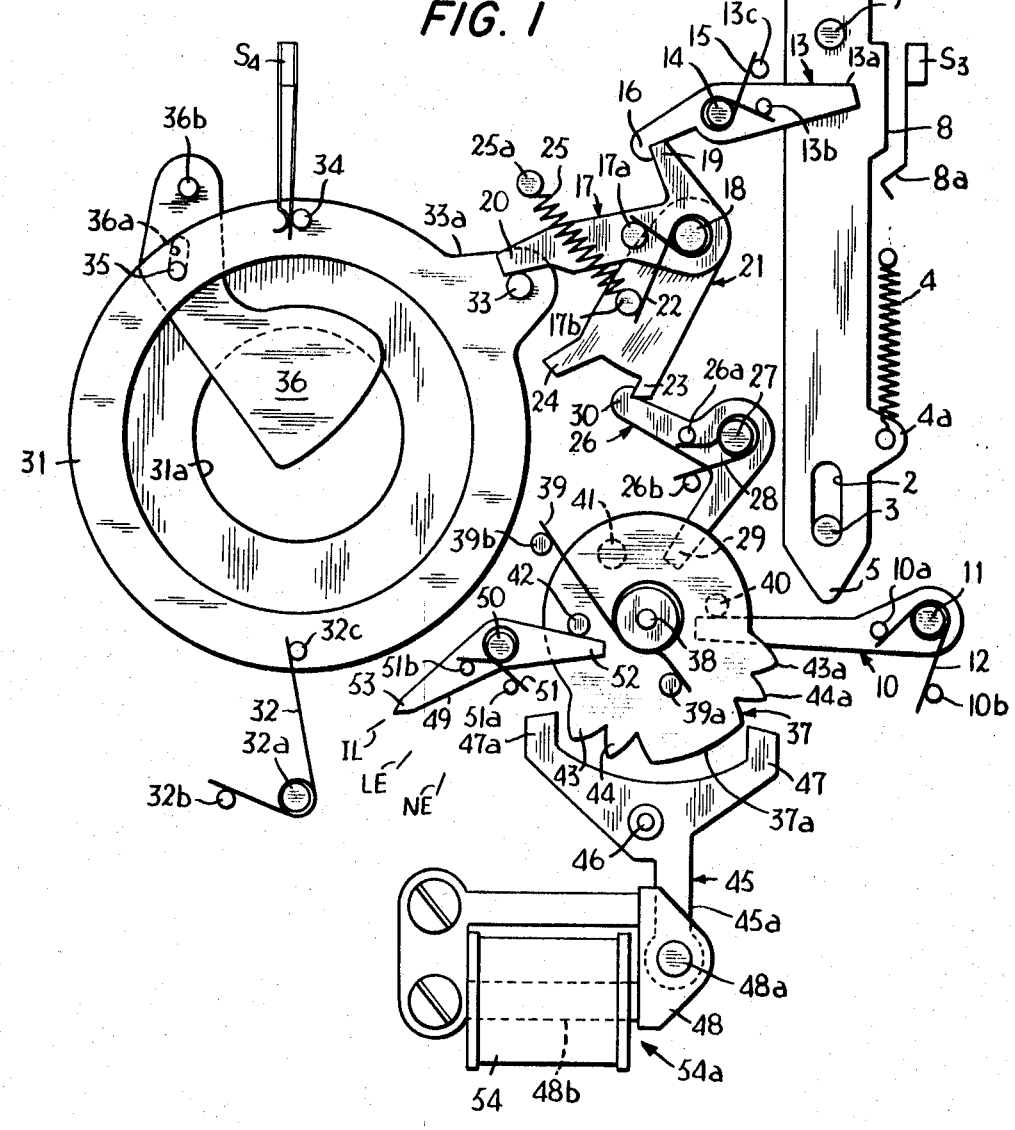

FIG. 1 is a diagrammatic illustration of a portion of the apparatus of the present invention; and FIG. 2 is a schematic representation of the electrical circuit for the present invention Turning now to the drawings and in particular to FIG. 1, there is shown an endwise movable elongated manually operated trigger lever 1 having formed in each end section an elongated slot 2 each of which receives a corresponding one of two fixed guide pins 3, the pins and the slots 2 cooperating to limit vertical (FIG. 1) movement of the lever 1 to a predetermined distance. The lever 1 is biased upwardly (FIG. 1) by a coil spring 4 which is secured at one end to a pin fixed to a tab 4a integrally formed with and extending outwardly from the lever 1 to the right as seen in FIG. 1 and by its other end to a fixed pin. Also integrally formed with and extending outwardly of and to the right of the lever 1 are a pair of spaced switch contacting or actuating surfaces 6 and 8 having leading edges that are aligned with the contact arms 8a and 6a, respectively, of the switches S1 and S3, respectively. The switch contacting surfaces 6 and 8 are located on the upper half of the trigger lever 1. On the opposite side of the trigger lever 1 is formed a third switch contacting or actuating surface 7 integrally formed with the lever 1 and having a leading edge that is aligned with the control arm 7a of a switch S2. The bottom end of the elongated manually operable trigger lever 1 is formed with a lever contacting end 5 that is aligned with an elongated locking lever 10 that is pivotally mounted by one end section on a shaft 11 about which is wrapped a spring 12 having one end section in contact with a pin 10a that is mounted on the lever 10, while the other end section of the spring 12 contacts a fixed pin 10b, the spring 12 being arranged to bias the lever 10 in a clockwise direction (FIG. 1). Also formed on the lever 1 on the upper half thereof is a lever actuating pin 9 that is aligned with a pin contacting arm 13a of an elongated hook lever 13 that is pivotally mounted on a shaft 14 intermediate the ends thereof. Wrapped about the shaft 14 is a spring 15 having one end section in contact with a pin 13b mounted on the arm 13a, the other end section of the spring being in contact with a fixed pin 13c, the lever 13 being biased in a counterclockwise direction by the spring 15. The other arm of the hook lever 13 includes a hook 16 that is normally in locking engagement with a locking arm 19 of a substantially V-shaped lever 17 that is pivotally mounted substantially at the junction of the arms of the V-shaped lever on a shaft 18. Wrapped about the shaft 18 is a spring 22 having one end section in contact with a pin 17a that is fixed to the lever 17, the other end section of the spring being in contact with a pin 17b mounted on an elongated intermediate lever 21 intermediate the ends thereof. The other arm of the substantially V-shaped lever 17 is a pin contacting arm 20. The elongated intermediate lever 21 is pivotally mounted at one end on the shaft 18 and has formed at its other end a pair of spaced fingers, i.e. a locking finger 23 and a pin contacting finger 24. Secured by one end to the pin 17b is a coil spring 25 that is secured by its other end to a fixed pin 25a, the spring 25 being arranged to bias the lever 21 in a clockwise direction (FIG. 1). The spring 22 is arranged to bias the levers 17 and 21 so that the arm 20 of the lever 17 is urged in the direction of the finger 24 of the lever 21 to effect a scissors action between the two levers. The locking finger 23 is normally engaged by a hook 30 formed on the end of one arm of a substantially V-shaped hook lever 26 that includes a pin contacting arm 29 and is pivotally mounted at the junction of its arms on a shaft 27. Wrapped about the shaft 27 is a spring 28 having one end section in contact with a pin 26a mounted on the lever 26 the other end section being in contact with a fixed pin 26b, the spring 28 being arranged to bias the lever 26 in a clockwise direction.

The free end section of the pin contacting arm 20 of the lever 17 is aligned with a pin 33 formed on a tab 33a that is integrally formed with and extending radially of a ring 31 that is rotatable about an optical axis as indicated by the disc-shaped aperture 31a. The ring 31 is biased in a counterclockwise direction (FIG. 1) by a spring 32 that is wrapped about a fixed pin 32a and includes one end section engaged with a fixed pin 32b the other end being engaged with a pin 32c mounted on the ring 31. Two other pins are mounted on the periphery of the ring 31 including a switch contacting pin 34 that is aligned with the contact arm of a timing switch S4, so that as the ring 31 is rotated the pin 34 will be brought into or out of engagement with the switch S4. The remaining pin, 34, of the plurality of spaced pins mounted on the periphery of the ring 31 is received by an elongated slot 36a formed in a sector blade 36. It is here noted that the sector blade 36 is only one of a plurality of such blades which are normally used in a conventional camera to open or close the exposure aperture. Only one of the sector blades is shown for purposes of clarity.

Directly below the substantially V-shaped hook lever 26 (FIG. 1) is a substantially disc-shaped cam plate 37 pivotally mounted on a shaft 38 about which is wrapped a spring 39 that includes one end section in contact with a pin 39a that is mounted on one face of the plate 37, the other end section of the spring 39 being in contact with a fixed pin 39b, the spring 39 being arranged to bias the cam plate 37 in a clockwise direction (FIG. 1). Also formed on the same face of the cam plate 37 as the pin 39a is a switch contacting pin 42 that is spaced from the pin 39a. On the opposite face of the cam plate 37 there are formed a pair of lever contacting pins 40 and 41, the pin 41 being aligned with the pin contacting arm 29 while the pin 40 is aligned with the lever 10. The cam plate 37 is formed with a tail section 36a that is integrally formed with the cam plate but extends outwardly beyond the periphery thereof, the tail section 37a being formed between two pairs of ears 43 and 43a and 44 and 44a which also are integrally formed with the cam plate 37 and extend beyond the periphery of the cam plate. The ears 43 and 44 in the tail section 37a are received, as shown in FIG. 1, between the arms 47 and 47a of a substantially Y-shaped pawl 45 which also includes a supporting arm 45a, the pawl being pivotally mounted at the junction of the arms on a shaft 46. The Y-shaped pawl 45 and the cam plate 37 form a type of escapement mechanism that provides for limited movement of the cam plate 37 as will be described in more detail below. The arm 45a of the Y-shaped pawl 45 is pivotally mounted on a shaft 48a that is mounted on an iron piece 48 to which is secured an iron core 48b that is received in an electromagnetic coil 54 of an electromagnet 54a. The pin 42 on the cam plate 37 is aligned with an arm 52 of an elongated slightly V- shaped indicator arm 49 having a pointer arm 53, the lever 49 being pivotally mounted intermediate its ends on a shaft 50. Wrapped about the shaft 50 is a spring 51 having one end in contact with a fixed pin 51a and the other end in contact with a pin 51b that is mounted on the pointer arm 53, the spring 51 being arranged to bias the indicator 49 arm in a counterclockwise direction (FIG. 1).

The width of the gap between the leading edge of the contact surface 6 and the contact arm 6a of the switch S1 is less than the distance between the end 5 of the lever 1 and the elongated locking lever 10 in the position shown in FIG. 1. The width of the gap between the leading edge of the contact surface 7 and the contact arm 7a of the switch S2 is equivalent to the distance that the cam plate 37 travels as it moves to a distance equivalent to the width of the ear 43; and the width of the gap between the leading edge of the contact surface 8 and the contact arm 8a of the switch S3 is equal to the distance that the cam plate 37 travels through a distance equal to the width of the two ears 43 and 44; and the distance between the pin 9 and the pin contacting arm 13a is greater than the width of the gap between the leading edge of the contact surface 8 and the contact arm 8a of the switch S3.

Turning now to the electrical circuit shown in FIG. 2 a self-contained source of electrical energy or battery 55 includes a positive side connected to one side of a photoconductive element 56 the other side of which is connected a junction point 60. The positive side of the battery 55 is also connected through a transistor 58 to the collector of a transistor T1 and to the base of a transistor T2. The positive side of the battery is also connected through the electromagnet 54 to the collector of the transistor T2. The negative side of the battery is connected to one side of each of the switches S1, S2 and S3, the other side of the switch S1, being connected to a junction point 63, the other side of the switch S2 being connected to a junction point 62 and the other side of the switch S3 being connected to a junction point 61. The junction point 63 is also connected through a resistor 59 to the emitters of the transistors T1 and T2. The junction point 63 is also connected to one side of a resistor R1 the other side of which is connected to the junction point 62. The junction 62 is connected to one side of a reference resistor R2 the other side of which is connected to the junction point 61 which is also connected to one side of the switch S4 and a capacitor 57 which are parallel and on the other side thereof to the junction point 60 which is also connected to the base of the transistor T1. It is noted that the trigger lever 1 is connected to the same ground as the negative side of the battery 55.

Turning now to the operation of the apparatus as described above, when the trigger lever 1 is depressed and moved downwardly (FIG. 1) the leading edge of the actuating surface 6 of the lever 1 is brought into engagement with the contact arm 6a of the switch S1, thereby closing that switch. With the switch S1 closed, the photoconductive element 56 is placed across the battery 55 through the resistors R1 and R2 and the normally closed timing switch S4, the voltage at the junction 60 being divided by the resistance of the photoconductive element 56 and the combined resistances of the reference resistors R1 and R2 which voltage is applied to the base of the transistor T1. Thus, if the subject to be photographed is not illuminated with sufficient light the resistance of the photoconductive element 56 is relatively high and the first transistor T1 will not conduct, however, the second transistor T2 is placed in its conducting state, thereby to energize the electromagnet 54. With the electromagnet 54 energized, the Y-shaped pawl 45 is fixed in the position shown in FIG. 1 so that when the end 5 of the trigger lever 1 comes into engagement with the lever 10 and pushes the lever 10 downwardly the cam plate 37 although it is free of engagement with the lever 10 via the pin 40, it may not rotate in a clockwise direction under the urging of the spring 39 because the arm 47a of the y-shaped pawl 45 serves to block such movement. With the cam plate 37 in this position, shown in FIG. 1, the pointer arm 53 of the indicator lever 49 is aligned with the indicia IL which indicates that there is insufficient light to allow the operator to take a photograph of the subject utilizing daylight only. However, if there is sufficient daylight available to illuminate the subject being photographed, then the base voltage of the first transistor T1 is increased to the point where that transistor becomes conductive which in turn leads to the cut off of T2. When the second transistor T2 ceases conducting then the electromagnet 54 is deenergized which in turn frees the Y-shaped pawl 45 so that the pawl may pivot freely about the shaft 46 which thereupon allows the cam plate to rotate in a clockwise direction (FIG. 1) through the bias supplied by the spring 39 after the lever 10 is moved downwardly by the end 5 of the trigger lever 1. When the ear 43 rides over the arm 47a of the Y-shaped pawl 45 the cam plate 37 rotates in a clockwise direction, the second switch S2 closes, the reference resistor R1 is shortened and a detecting circuit including the photoconductive element 56, the timing switch S4, switch S2 and the second reference resistor R2 is thereby formed. When the ear 43 rides over the arm 47a the pointer arm 53 is permitted to move to the indicia LE (Long Exposure) to indicate that there is insufficient light to take a normal exposure (NE), thereby serving as a warning to the operator of the camera because during a long exposure the slightest camera vibration will ruin the picture.

When the object to be photographed is bathed in sufficient natural light for a normal exposure the resistance of the photoconductive element 56 will be sufficiently low so that the voltage applied to the base transistor T1 will be high enough to maintain that transistor in its conducting state, thus, the second transistor gap T2 will not conduct and the electromagnet 54 will be deenergized to permit the cam plate 37 to rotate in the clockwise direction after the end 5 of the lever 1 has pivoted the lever 10 in a counterclockwise direction about the shaft 11. As the trigger lever 1 is pushed further downwardly the leading edge of the actuating surface 8 engages the contact arm 8a to close the switch S3 as the second ear 44 moves over the arm 47a of the substantially Y-shaped pawl 45. With the switch S3 closed the reference resistor R2 is shortened so that the voltage at the base of the transistor T2 becomes zero terminating the conducting state of that transistor. Since the transistor T1 is in its nonconducting state and the second transistor T2 is in its conducting state and the electromagnet 54 is energized to stop the rotation of the cam plate 37 at the point at which the pointer arm 53 is aligned with the indicia NE that indicates that the operator may take a photograph using natural light and without having to rely on a long exposure time.

In each of the aforementioned three instances, i.e., film exposure utilizing natural light only not possible, film exposure utilizing natural light possible but only after a long exposure time, film exposure utilizing natural light possible after only a normal exposure time, further depression of the trigger lever 1 moves the lever actuating pin 9 into engagement with the pin actuating arm 13a of the elongated hook lever 13 to pivot the hook lever 13 in a clockwise direction (FIG. 1) thereby to release the hook 16 from engagement with the locking arm 19 of the V-shaped lever 17. Lever 17 therefore is rotated in a counterclockwise direction (FIG. 1) by the bias exerted by the spring 22 thereby moving the pin contacting arm 20 into engagement with the pin 33 and as the arm 20 moves downwardly the pin 33 is pushed in the same direction to rotate the ring 31 in a clockwise direction (FIG. 1). As the ring 31 moves in a clockwise direction the sector blade 36 begins moving towards its open position thereby beginning the exposure of the film strip in the camera. In addition, as the ring 31 is moved in a clockwise direction the pin 34 moves away from engagement with the contact arm of the timing switch S4 thereby opening that switch and switching the detection circuit to the delay circuit whereby the current flowing through the photoconductive element 56 charges the capacitor 56 in proportion to the amount of light that bathes the subject to be photographed. Thus, the voltage at the junction 60 increases to a point where the first transistor T1 is placed in its conducting state and as soon as the transistor T1 begins to conduct the transistor T2 ceases to conduct thereby deenergizing the electromagnet 54 to release the Y-shpaed pawl 45 for rocking movement about the pin 46 and consequently to allow the cam plate 37 to pivot in a clockwise direction (FIG. 1) under the urging of the spring 39. Starting from the position of the elements shown in FIG. 1 where the pointer arm 53 indicates insufficient light to take a photograph, the cam plate 37 rotates in a clockwise direction a distance equivalent to one of the ears 43 thereby to allow the indicator lever to pivot in a counterclockwise direction (FIG. 1) under the urging of the spring 51 to move the pointer arm 53 to the position where it is aligned with the indicia LE indicating that a long exposure time is necessary because of the insufficient amount of light that illuminates the subject to be photographed. If there was sufficient light illuminating the subject to be photographed, the capacitor would be charged to a degree that would permit the transistor T1 to remain conductive for an added period of time, thereby allowing the cam plate 37 to advance another of the ears 44 thereby to allow the indicator lever 49 to pivot counterclockwise a further distance to bring the pointer arm 53 into alignment with the indicia NE which indicates that normal exposure is possible. As the cam plate 37 rotates in a counterclockwise direction the pin 41 is brought into engagement with the pin contacting arm 29 of the substantially V-shaped lever 26 thereby to rotate the lever 26 in a counterclockwise direction (FIG. 1) to release the hook 30 from locking engagement with the finger 23. With the finger 23 released from locking engagement with the hook 30 the elongated intermediate 21 pivots in a clockwise direction (FIG. 1 to bring the pin contacting finger 24 into engagement with the pin 33 on the ring 31 thereby to rotate the ring 31 in a counterclockwise direction (FIG. 1). As the ring 31 is moved in a counterclockwise direction by the finger 24 and pin 33 the sector blade 36 is moved back to its closed position thereby to terminate the exposure of the film strip in the camera. As can be understood from the above the pointer arm 53 will be moved to the position corresponding to the set of external lighting conditions prevalent at the time that the operator depresses the trigger lever 1 before the exposure operation begins, thereby to show or warn the operator of such conditions. It should be noted that the indicator lever 49 could be connected to further apparatus which would energize a flash device when there was not sufficient light available to take a photograph or even if there was sufficient light available to take a photograph but required a long exposure time. In addition, it would be possible to incorporate apparatus for locking the trigger lever 1 against further downward movement when insufficient light was available to take a photograph by means of the natural light available to the subject to be photographed after the switch S3 was closed, and provide a connection between the indicator 49 and the switch S4 so that when the pointer arm 53 is moved to the position indicating insufficient light available for taking a photograph the timing switch S4 would be opened and a flash attachment connected to the battery would be energized so that the photograph could be taken by means of the artificial light supplied by the flash equipment.

The present invention provides an arrangement that utilizes the light indicating circuit, including a photoconductive element, as a light detecting circuit by the switching operation previously described. The light indicating circuit is utilized to provide the operator with a visual indicator that either there is not enough light available to take a photograph or that there is sufficient light available but that a long exposure time is required or that there is sufficient light available to take a photograph using only a normal exposure time. Furthermore, all of the above is accomplished by a switching action that is automatic and wherein the depression of the trigger lever is accomplished in a smooth continuous motion which obviates any jarring of the camera which would be undesirable in that the movement of the camera normally results in a blurred photograph.

What I Claim And Desire To Secure By Letters Patent Is:

1. In a camera having a shutter and electrical circuitry for controlling the operation of the camera shutter, means for opening and closing the shutter to produce an exposure, electric circuit means including means for sensing the brightness of a selected subject prior to the opening of the shutter for an exposure, indicator means visible to the camera operator having a plurality of possible positions including; a position indicating that the brightness of the selected subject is sufficient to take a normal daylight exposure, a position indicating that the brightness of the selected subject is only sufficient to take a long daylight exposure relatively to the normal exposure, and a position indicating that the brightness of the selected subject is not sufficient to take a daylight exposure, and means responsive to said sensing means for selecting the position of the indicator means corresponding to the brightness of the subject.

2. In a camera having a shutter as set forth in claim 1 wherein said selecting means includes electromagnetic means responsive to said sensing means and mechanical means connected to and responsive to said electromagnetic means and operatively connected to said indicator means 3. In a camera having a shutter as set forth in claim 2 wherein said indicator means includes a movable pointer arm and indicia representing the corresponding brightness of the selected subject as sensed by said sensing means, said pointer arm being movable to align with the indicia corresponding to the brightness of the selected subject as sensed by said sensing means.

4. In a camera having a shutter as set forth in claim 3 wherein said means for opening and closing the shutter includes a manually operable trigger lever and a mechanical train operatively connected to said shutter and to said mechanical means and to said trigger lever.

5. In a camera having a shutter as set forth in claim 4 wherein said mechanical means includes an escapement mechanism that includes a substantially Y-shaped pawl connected to said electromagnetic means and a rotatable cam plate having a pin engageable with said pointer arm.

6. In a camera having a shutter as set forth in claim 5 wherein said electrical circuit means includes a self-contained electrical energy source and a plurality of transistors energizable by said electrical energy source, and wherein said sensing means includes a photoconductive element connected to a first one of said plurality of transistors and said electromagnetic means includes an electromagnet connected to a second one of said plurality of transistors.

7. In a camera having a shutter as set forth in claim 1 wherein said indicator means includes a movable pointer arm and indicia representing the corresponding brightness of the selected subject as sensed by said sensing means, said movable pointer arm being movable to align with the indicia corresponding to the brightness of the selected subject as sensed by said sensing means.

8. In a camera having a shutter as set forth in claim 2 wherein said selecting means includes electromagnetic means responsive to said sensing means and mechanical means connected to and responsive to said electromagnetic means and operatively connected to said pointer arm.

9. In a camera having a shutter as set forth in claim 1 wherein said means for opening and closing the camera shutter includes a manually operable trigger lever and a mechanical train connected to said shutter and to said trigger lever.

10. In a camera having a shutter as set forth in claim 1 wherein said indicator means includes a pointer arm and said selecting means includes electromagnetic means responsive to said sensing means and mechanical means connected to and responsive to said electromagnetic means and operatively connected to said indicator means and wherein said mechanical means includes an escapement mechanism operatively connecting said electromagnetic means to said pointer arm.